(12) United States Patent
Rowlands et al.

(10) Patent No.: US 12,373,278 B1
(45) Date of Patent: Jul. 29, 2025

(54) SAN SINGLE PATH POINT OF FAILURE DETECTION

(71) Applicant: Dell Products L.P., Hopkinton, MA (US)

(72) Inventors: Scott Rowlands, Cumming, GA (US); Krishna Deepak Nuthakki, Bangalore (IN); Arieh Don, Newton, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/598,118

(22) Filed: Mar. 7, 2024

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01)

(58) Field of Classification Search
CPC ........................... G06F 11/0709; G06F 11/079
See application file for complete search history.

(56) References Cited

U.S. PATENT DOCUMENTS

| | | | | |
|---|---|---|---|---|
| 8,725,878 | B1* | 5/2014 | Gillam | H04L 41/0836 |
| | | | | 709/226 |
| 2011/0296230 | A1* | 12/2011 | Chen | H04L 49/557 |
| | | | | 714/E11.078 |
| 2020/0133895 | A1* | 4/2020 | Crowley | G06F 9/45558 |
| 2020/0136897 | A1* | 4/2020 | Smith | H04L 67/1097 |
| 2020/0145282 | A1* | 5/2020 | Copley | H04L 49/25 |

\* cited by examiner

*Primary Examiner* — Elmira Mehrmanesh
(74) *Attorney, Agent, or Firm* — Anderson Gorecki LLP

(57) ABSTRACT

A storage array is configured to detect single points of failure (SPoFs) that could cause a host application to fail. Zoning information obtained from network switches is used with initiator-target login information to determine whether all host server HBA port initiators logged in to a storage object maintained by the storage array are from the same zone. If so, a path-based SPOF alert is generated. If all host server HBA port initiators logged in to the storage object are from the same HBA, then a NIC-based SPOF alert is generated. A masking view is used with the zoning information and initiator-target login information to determine whether all host server HBA port initiators logged in to the storage object are from the same host server. If so, a clustering-based, nodal SPOF alert is generated.

20 Claims, 5 Drawing Sheets

SAN SINGLE PATH POINT OF FAILURE DETECTION

TECHNICAL FIELD

The subject matter of this disclosure is generally related to using a storage array for detection and localization of single points of failure in a data center.

BACKGROUND

Data centers can include a variety of high-capacity, multi-user data storage systems such as storage area networks (SANs) with storage arrays that maintain storage objects that are contemporaneously accessed by multiple instances of host applications running on clusters of host servers. The storage arrays and host servers can be interconnected via multiple layers of network switches. Redundancy is supposed to help to prevent host applications from becoming unable to access storage objects, but single points of failure can occur and remain unnoticed until a failure event.

SUMMARY

In accordance with some embodiments, a method comprises: obtaining zoning information by signaling to network switches connected between a host application running on at least one host server and a storage node that maintains a host application image on at least one storage object; identifying all host server initiator ports logged-in to the storage object; computing whether all host server initiator ports logged-in to the storage object are from a single zone; and signaling a path-based single point of failure alert responsive to determining that all host server initiator ports logged-in to the storage object are from a single zone.

In accordance with some embodiments, an apparatus comprises: a plurality of interconnected compute nodes that manage access to data stored on a plurality of managed drives; and a single point of failure detector running on at least one of the compute nodes and configured to: obtain zoning information by signaling to network switches connected between a host application running on at least one host server and a storage node that maintains a host application image on at least one storage object; identify all host server initiator ports logged-in to the storage object; compute whether all host server initiator ports logged-in to the storage object are from a single zone; and signal a path-based single point of failure alert responsive to determining that all host server initiator ports logged-in to the storage object are from a single zone.

In accordance with some embodiments, a non-transitory computer-readable storage medium stores instructions that are executed by a storage array to perform a method comprising: obtaining zoning information by signaling to network switches connected between a host application running on at least one host server and a storage node that maintains a host application image on at least one storage object; identifying all host server initiator ports logged-in to the storage object; computing whether all host server initiator ports logged-in to the storage object are from a single zone; and signaling a path-based single point of failure alert responsive to determining that all host server initiator ports logged-in to the storage object are from a single zone.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
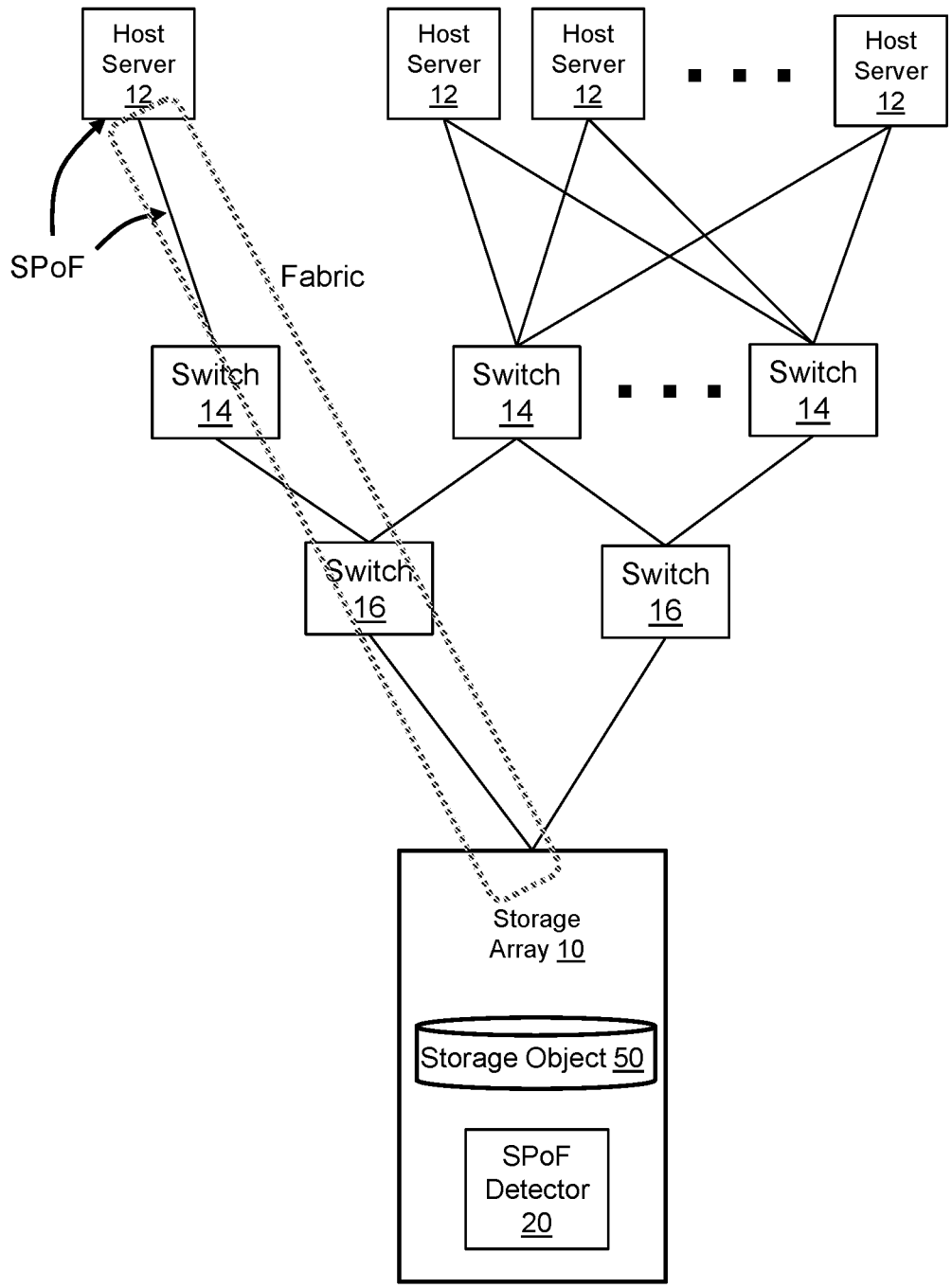
FIG. 1 illustrates a data center in which a storage array is configured to detect single points of failure.

FIG. 1 illustrates a data center in which a storage array 10 is configured to detect single points of failure (SPoF). The storage array, which is one type of storage node, maintains storage objects such as storage object 50 that are accessed by instances of host applications running on host servers 12. The storage object, or group of storage objects, contains a host application image that is all the data generated and used by a single host application. The host servers communicate with the storage array via multiple layers of network switches, including a first layer of switches 16 that are logically adjacent to the storage array and a second layer of switches 14 that are logically adjacent to the host servers. A SPOF is any single link, node, or subsystem that is the sole means for IO commands and data to travel between a host application instance and its associated storage object 50. The link, node, or subsystem does not have to be in a failed state to be a SPOF. Rather, the link, node, or subsystem that would stop traffic between the host application instance and the storage object if that link, node, or subsystem failed is a SPOF. A nodal SPOF may exist if host clustering is required, and the host application is only running on a single host server. Host clustering is a requirement that instances of the host application are running on multiple host servers that can access the storage object, so failure of a host server does not result in failure of the host application. A SPOF detector 20 running on storage array 10 is configured to detect and localize SPoFs based on ongoing monitoring as will be explained below.

Figure 2:
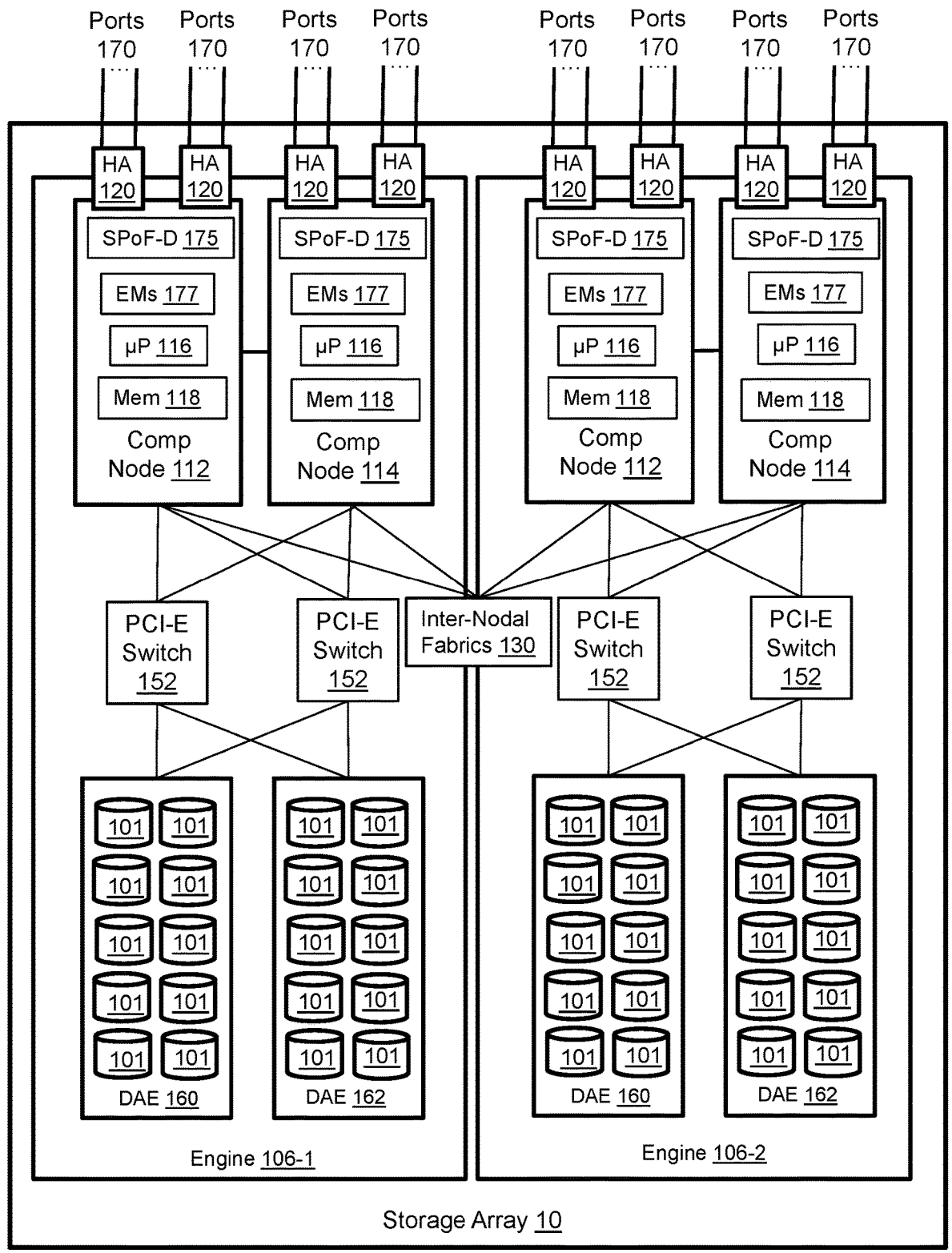
FIG. 2 illustrates the storage array in greater detail.

FIG. 2 illustrates storage array 10 in greater detail. The storage array includes two engines 106-1, 106-2, although there may be any number of engines. Each engine includes disk array enclosures (DAEs) 160, 162 and a pair of peripheral component interconnect express (PCI-E) interconnected compute nodes 112, 114 (also known as storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more host adapters (HAs) 120, that are network interface cards (NICs) with ports 170 for communicating with host servers. Each compute node also includes one or more adapters for communicating with other compute nodes via redundant inter-nodal channel-based InfiniBand fabrics 130.

Each compute node 112, 114 runs emulations (EMs 177) that perform different storage-related tasks and functions. Front-end emulations handle communications with the host servers. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. SPOF detectors 175 may include one, or more, of special purpose electronic components, logic, and computer program code loaded into memory 118 from the managed drives 101 and run on the processors 116.

Figure 3:
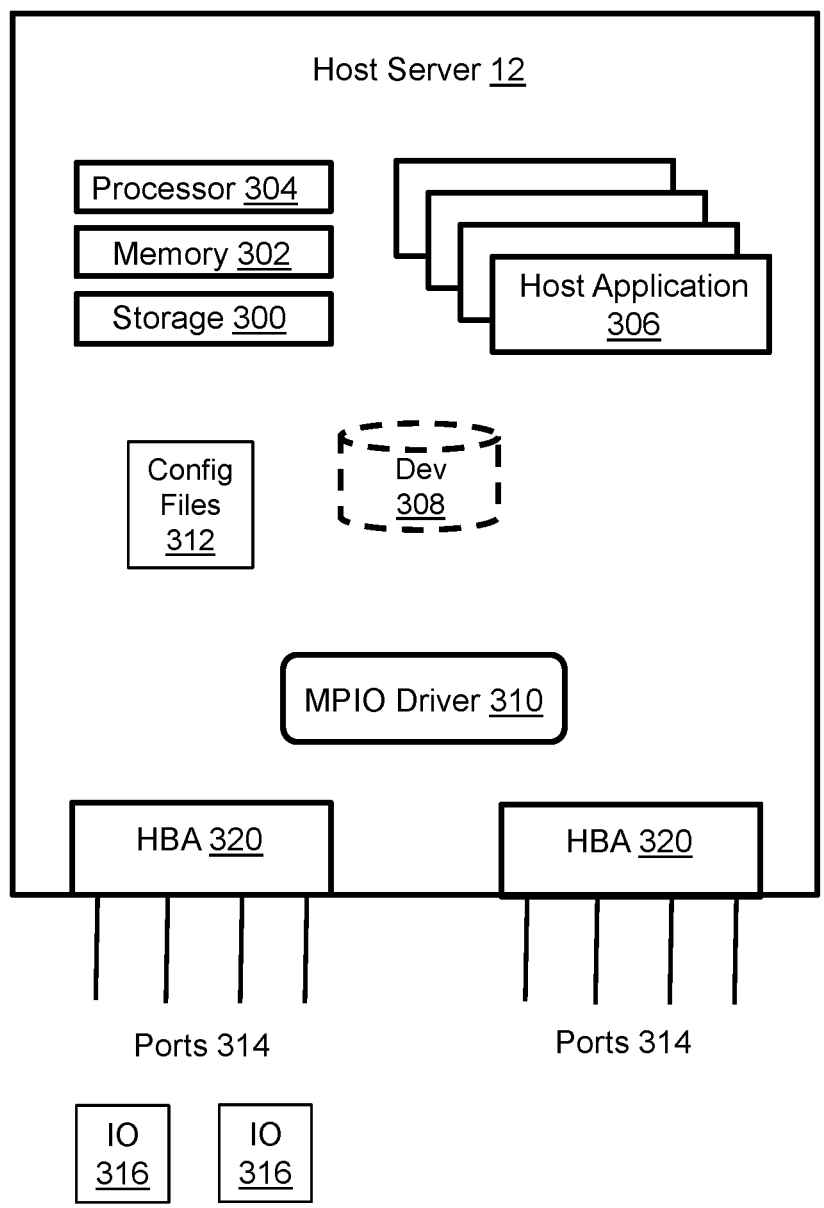
FIG. 3 illustrates one of the host servers in greater detail.

FIG. 3 illustrates one of the host servers 12 in greater detail. Each host server includes volatile memory 302, non-volatile storage 300, one or more tangible processors 304 that support instances 306 of a host application, a Multi-Path Input-Output (MPIO) driver 310 running in the host kernel, and a plurality of host bus adapter (HBA) 320 NICs, each with multiple ports 314. Examples of host applications might include, but are not limited to, software for email, accounting, sales, inventory control, manufacturing, and a wide variety of other organizational functions. The MPIO driver 310 discovers the storage object 50 (FIG. 1) that is maintained and presented by the storage array for host application instances running on the host server. A corresponding logical host device 308 that is a representation of that storage object is generated locally for access by the host application instances. The instances of the host application use the logical host device 308 for data access, e.g., to read and write host application data to logical addresses. Corresponding IOs 316 are generated and sent to the storage array via the MPIO driver and HBAs to access the storage object to read and write data. More specifically, the MPIO driver selects from among multiple available paths, if they exist, between the host server and the storage array in order to balance IO loading. Each IO is sent to the storage array via the host server and storage array ports corresponding to the selected path. Configuration files 312 maintained by the host server include metadata that describes the paths supported by the host server. For example, the port IDs and authentication credentials for each supported path are included in the configuration files, which may be persistently stored in storage and copied into memory for low latency access during operation. The HBA includes components such as IO chips that monitor link errors and IO failures such as missing frames, timeouts, and received aborts.

Figure 4:
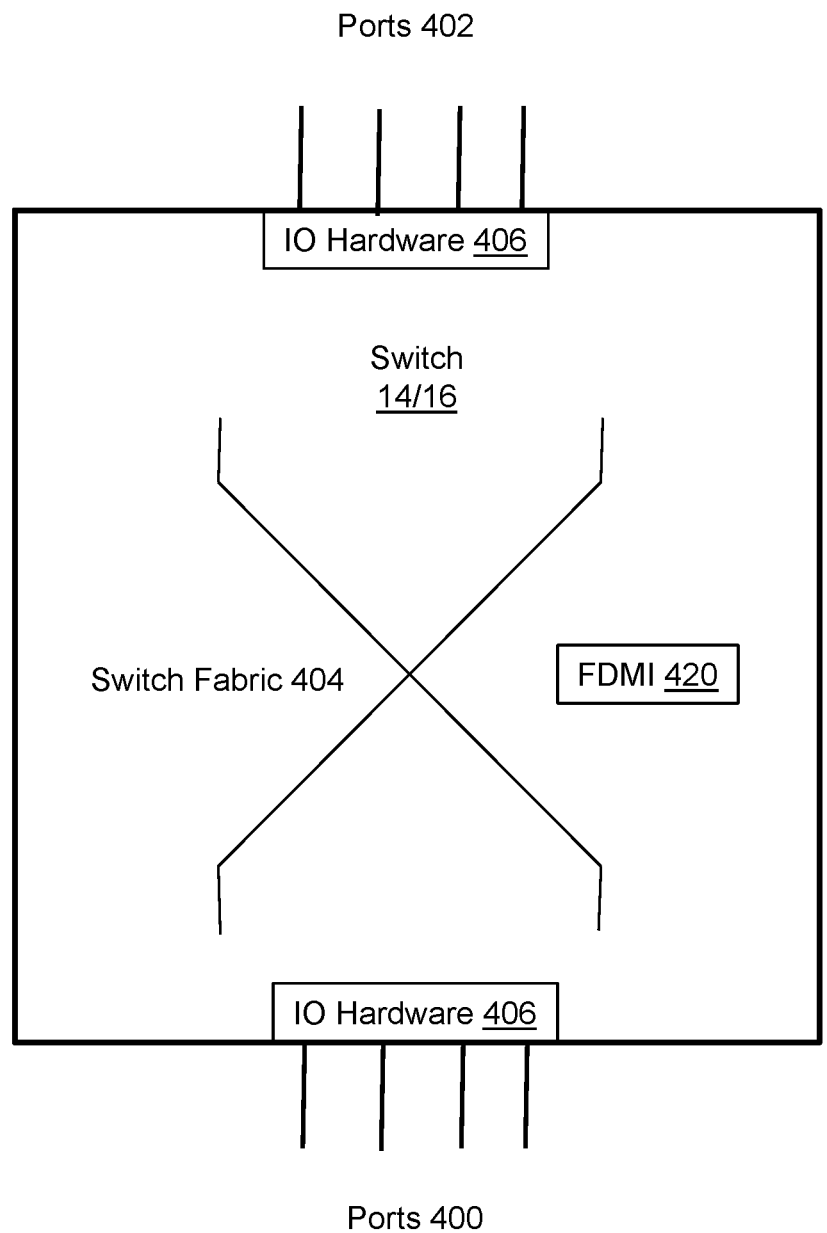
FIG. 4 illustrates one of the network switches in greater detail.

FIG. 4 illustrates one of the network switches 14, 16 in greater detail. Each network switch includes a first group of ports 400 that are interconnected with a second group of ports 402 via a switch fabric 404. For switch 14, ports 402 are host ports on the host server side of the paths and ports 400 are inter-switch link (ISL) ports that connect to ISL ports of a switch 16. For switch 16, ports 402 are ISL ports that connect to a switch 14 and ports 400 are storage ports on the storage array side of paths. The switch fabric 404 enables any of the ports 400 to be connected to any of the ports 402 to redirect communications along the configured paths. IO hardware 406 associated with the ports includes components such as IO chips that monitor link errors and IO failures such as missing frames, timeouts, and received aborts.

Referring to FIGS. 1 through 4, a "zone," such as a Fibre Channel (FC) "fabric," is defined by the HBA ports 314, network switch ports 400, 402, and HA ports 170 that can be used by a host application instance 306 to access storage object 50. In other words, each zone is a group of ports that define a path between a host application and the storage object. Each network switch includes a Fabric Device Management Interface (FDMI) 420 that enables any storage endpoint, including the storage array, to register to the FC fabric and query the HBA and port details of the entire FC fabric. Each port is uniquely identified by a worldwide name (WWN). HBA ports 314, as IO "initiators," login to HA ports 170, which are IO "targets." Each initiator-target port pair defines an IO path.

A host server that is registered with a storage array is characterized as being "zoned." Zoned host servers are not able to send RD/WR IOs to storage objects unless they are also masked to those storage objects. A masking view created and maintained by the storage array limits discovery of storage objects and access by host computers in accordance with authorizations as indicated by the masking view, so host applications cannot access the data of other host applications. A host server that is masked to at least one storage object is characterized as being "masked."

For each storage object maintained by the storage array, the SPOF detector 20 identifies the HBA port initiators that are logged-in to that storage object from information that is journaled or logged by the storage array. The SPOF uses the FDMIs 420 to determine whether all the identified initiators are associated with the same zone. If all the identified initiators are associated with the same zone, then there is only a single path between the host application and the storage object. A sole path to the storage objects is a SPOF because a link or node failure along that path would sever connectivity between the host application and the storage object.

For each storage object maintained by the storage array, the SPOF detector 20 uses the FDMIs 420 to determine whether all the HBA port initiators that are logged-in to that storage object are associated with the same HBA. The HBA may be associated with multiple zones, but if all the identified initiators are associated with the same HBA, then failure of the HBA NIC would sever connectivity between the host application and the storage object so the HBA NIC would be a SPOF.

Some SPoF definitions may include a host server clustering requirement. Host server clustering requires that the storage object is accessible from instances of the same host application running on more than one host server. The initiators may be associated with multiple HBAs, and those HBAs may be associated with multiple zones, but if all the identified initiators are associated with the same host server, then failure of that host server would sever connectivity between the host application and the storage object so the single host server would be a SPoF.

Figure 5:
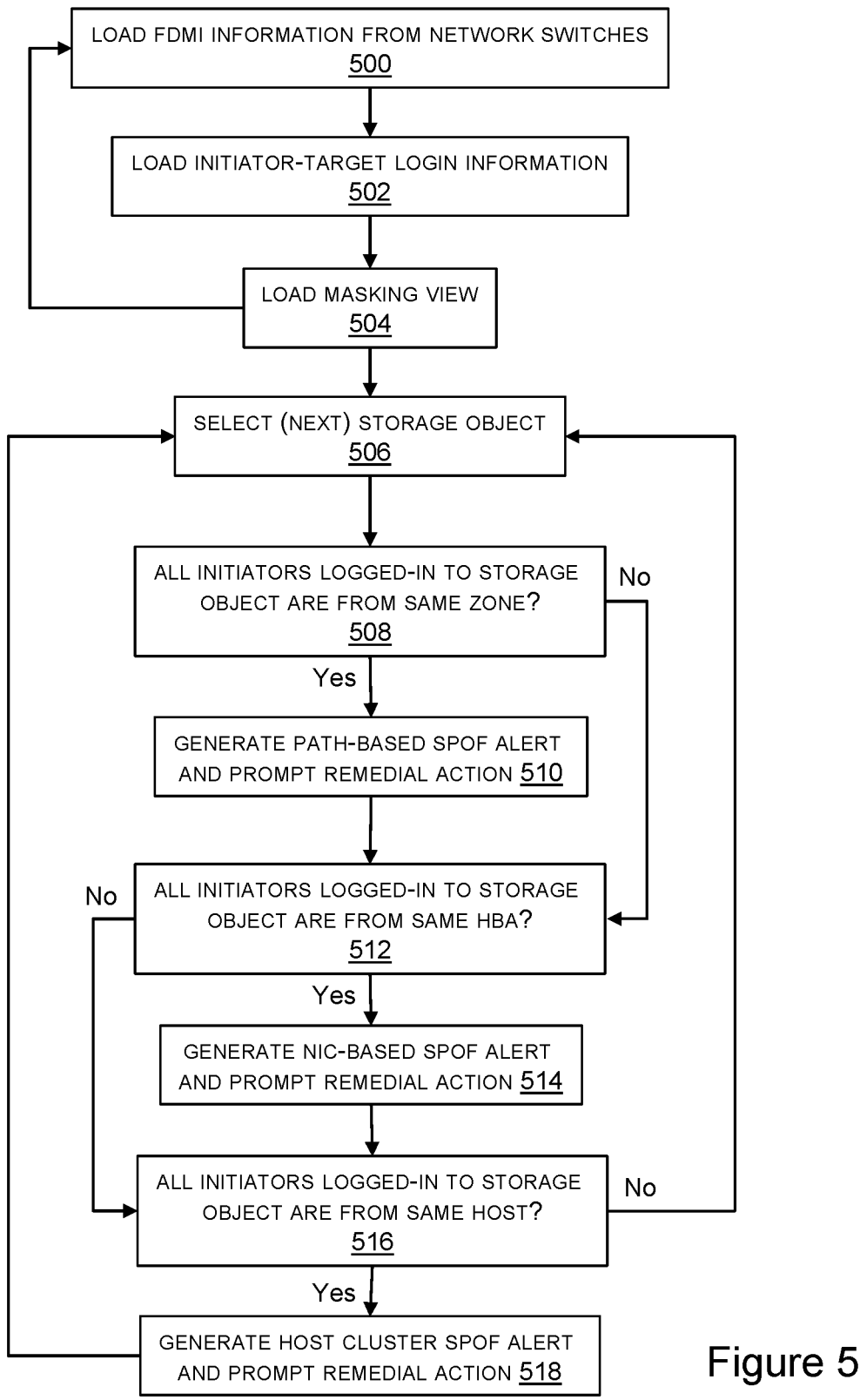
FIG. 5 illustrates a method for detecting single points of failure.

FIG. 5 illustrates a method for detecting single points of failure. In step 500 the SPOF detector uses the network switch FDMIs to obtain information about all zones associated with the storage array. The zone information includes identifications of the ports in each path to the storage array through the network switches. In step 502 the SPOF detector obtains initiator-target login information. The information identifies all initiators (HBA ports) that are logged in to storage objects maintained by the storage array. Each HBA port is uniquely identified by a WWN. The masking view is loaded in step 504. The masking view indicates host server authorization to access individual storage objects maintained by the storage array. Each host server is uniquely identified.

Detection may be performed by iteratively analyzing connectivity to each storage object of a plurality of storage objects, where a storage object or group of storage objects may contain a host application image. Step 506 is selecting a storage object as the basis for an iteration. In step 508 the SPOF detector determines whether all initiators currently logged in to the selected storage object are from the same zone. If all initiators currently logged in to the selected storage object are from the same zone, then a path-based SPOF alert is generated in step 510 and remedial action is prompted. The path-based SPOF alert indicates that there is a lone path between the host application and the storage object so connectivity would be severed by failure of the path, e.g., due to a link or network switch failure. In step 512 the SPOF detector determines whether all initiators currently logged in to the selected storage object are from the same HBA. If all initiators currently logged in to the selected storage object are from the same HBA, then a NIC-based SPOF alert is generated in step 514 and remedial action is prompted. The NIC-based SPOF alert indicates that there is a lone HBA NIC between the host application and the storage object so connectivity would be severed by failure of the HBA NIC. In step 516 the SPOF detector determines whether all initiators currently logged in to the selected storage object are from the same host server. If all initiators currently logged in to the selected storage object are from the same host server, then a clustering-based, nodal SPOF alert is generated in step 518 and remedial action is prompted. The clustering-based SPOF alert indicates that there is a sole host server supporting the host application so the host application would become inoperable if the host server crashed. The next storage object is then selected in step 506. It will be apparent that multiple types of alerts may be generated for a single storage object. Any of the alert testing steps could be disabled based on user requirements. For example, a user that does not require clustering might disable steps 516, 518.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
    obtaining zoning information by signaling to network switches connected between a host application running on at least one host server and a storage node that maintains a host application image on at least one storage object;
    identifying all host server initiator ports logged-in to the storage object;
    computing whether all host server initiator ports logged-in to the storage object are from a single zone; and
    signaling a path-based single point of failure alert responsive to determining that all host server initiator ports logged-in to the storage object are from a single zone.

2. The method of claim 1 further comprising loading and scanning initiator-target login information maintained by the storage node to identify all host server initiator ports logged-in to the storage object.

3. The method of claim 2 further comprising computing whether all host server initiator ports logged-in to the storage object are from a single host bus adapter, where associations between host server initiator ports and world-wide names are obtained from the network switches using a fabric device management interface (FDMI).

4. The method of claim 3 further comprising signaling a network interface card-based single point of failure alert responsive to determining that all host server initiator ports logged-in to the storage object are from a single host bus adapter.

5. The method of claim 4 further comprising loading a masking view.

6. The method of claim 5 further comprising using the FDMI to obtain information for computing whether all host server initiator ports logged-in to the storage object are from a single host server.

7. The method of claim 6 further comprising signaling a clustering-based single point of failure alert responsive to determining that all host server initiator ports logged-in to the storage object are from a single host server.

8. An apparatus comprising:
a plurality of interconnected compute nodes that manage access to data stored on a plurality of managed drives; and
a single point of failure detector running on at least one of the compute nodes and configured to:
  obtain zoning information by signaling to network switches connected between a host application running on at least one host server and a storage node that maintains a host application image on at least one storage object;
  identify all host server initiator ports logged-in to the storage object;
  compute whether all host server initiator ports logged-in to the storage object are from a single zone; and
  signal a path-based single point of failure alert responsive to determining that all host server initiator ports logged-in to the storage object are from a single zone.

9. The apparatus of claim 8 further comprising the single point of failure detector being configured to load and scan initiator-target login information maintained by the storage node to identify all host server initiator ports logged-in to the storage object.

10. The apparatus of claim 9 further comprising the single point of failure detector being configured to compute whether all host server initiator ports logged-in to the storage object are from a single host bus adapter, where associations between host server initiator ports and world-wide names are obtained from the network switches using a fabric device management interface (FDMI).

11. The apparatus of claim 10 further comprising the single point of failure detector being configured to signal a network interface card-based single point of failure alert responsive to determining that all host server initiator ports logged-in to the storage object are from a single host bus adapter.

12. The apparatus of claim 11 further comprising the single point of failure detector being configured to load a masking view.

13. The apparatus of claim 12 further comprising the single point of failure detector being configured to use the FDMI to obtain information to compute whether all host server initiator ports logged-in to the storage object are from a single host server.

14. The apparatus of claim 13 further comprising the single point of failure detector being configured to signal a clustering-based single point of failure alert responsive to determining that all host server initiator ports logged-in to the storage object are from a single host server.

15. A non-transitory computer-readable storage medium storing instructions that are executed by a storage array to perform a method comprising:
  obtaining zoning information by signaling to network switches connected between a host application running on at least one host server and a storage node that maintains a host application image on at least one storage object;
  identifying all host server initiator ports logged-in to the storage object;
  computing whether all host server initiator ports logged-in to the storage object are from a single zone; and
  signaling a path-based single point of failure alert responsive to determining that all host server initiator ports logged-in to the storage object are from a single zone.

16. The non-transitory computer-readable storage medium of claim 15 in which the method further comprises loading and scanning initiator-target login information maintained by the storage node to identify all host server initiator ports logged-in to the storage object.

17. The non-transitory computer-readable storage medium of claim 16 in which the method further comprises computing whether all host server initiator ports logged-in to the storage object are from a single host bus adapter, where associations between host server initiator ports and world-wide names are obtained from the network switches using a fabric device management interface (FDMI).

18. The non-transitory computer-readable storage medium of claim 17 in which the method further comprises signaling a network interface card-based single point of failure alert responsive to determining that all host server initiator ports logged-in to the storage object are from a single host bus adapter.

19. The non-transitory computer-readable storage medium of claim 18 in which the method further comprises loading a masking view and using the FDMI to obtain information for computing whether all host server initiator ports logged-in to the storage object are from a single host server.

20. The non-transitory computer-readable storage medium of claim 19 in which the method further comprises signaling a clustering-based single point of failure alert responsive to determining that all host server initiator ports logged-in to the storage object are from a single host server.

\* \* \* \* \*